(12) United States Patent
Tago et al.

(10) Patent No.: US 8,403,356 B2
(45) Date of Patent: Mar. 26, 2013

(54) CLIP STRUCTURE AND HOLDING STRUCTURE FOR INTERIOR MEMBER OF VEHICLE

(75) Inventors: Tsuyoshi Tago, Yokohama (JP); Michinori Kakumu, Toyota (JP); Sinji Tanaka, Ikeda (JP); Motonori Kitayama, Ikeda (JP)

(73) Assignee: Nifco Inc., Yokohama-shi, Kanagawa (JP)

( * ) Notice: Subject to any disclaimer, the term of this patent is extended or adjusted under 35 U.S.C. 154(b) by 152 days.

(21) Appl. No.: 12/736,000

(22) PCT Filed: Mar. 3, 2009

(86) PCT No.: PCT/JP2009/053917
§ 371 (c)(1),
(2), (4) Date: Oct. 29, 2010

(87) PCT Pub. No.: WO2009/110443
PCT Pub. Date: Sep. 11, 2009

(65) Prior Publication Data
US 2011/0057423 A1 Mar. 10, 2011

(30) Foreign Application Priority Data
Mar. 4, 2008 (JP) ................... 2008-053417

(51) Int. Cl.
*B60R 21/16* (2006.01)
*B60R 21/214* (2011.01)
*A44B 17/00* (2006.01)

(52) U.S. Cl. ............. 280/728.2; 24/581.11; 24/297; 24/458; 411/508; 296/214; 296/1.08

(58) Field of Classification Search ......... 280/728.2, 280/730.2; 24/581.1, 289, 292, 297, 458, 24/581.11; 411/508, 913; 296/214, 1.08, 296/39.1, 193.06
See application file for complete search history.

(56) References Cited

U.S. PATENT DOCUMENTS
5,647,713 A * 7/1997 Ge et al. ................. 411/509
(Continued)

FOREIGN PATENT DOCUMENTS
EP 1211137 A1 6/2002
JP 2003-95054 A 4/2003
(Continued)

OTHER PUBLICATIONS
European Patent Office, "European Search Report for EP 09 71 6890" Jan. 22, 2013.

*Primary Examiner* — Paul N Dickson
*Assistant Examiner* — Joselynn Y Sliteris
(74) *Attorney, Agent, or Firm* — Manabu Kanesaka

(57) ABSTRACT

Provided is a clip structure which can prevent components from falling off an attaching body or an attached body with a simple structure. Further provided is a holding structure for an internal member of a vehicle which can prevent the components from falling off an exterior member or an interior member with a simple structure. A clip assembly (11) includes a first clip having a clip (34) attached to a bracket (25), and a joint (36) as a removable portion connected to the clip 34; and a pin (38) as a second clip connected to the joint (36) and sandwiching a roof head lining (14) between the pin (38) and the joint (36). A holding load (F5) for releasing connection between the clip (34) and the joint (36) is sufficiently small compared to a holding load (F6) for releasing connection between the joint (36) and the pin (38).

8 Claims, 10 Drawing Sheets

U.S. PATENT DOCUMENTS

| | | | |
|---|---|---|---|
| 6,264,393 B1 * | 7/2001 | Kraus | 403/282 |
| 6,431,585 B1 * | 8/2002 | Rickabus et al. | 280/728.3 |
| 6,824,203 B2 | 11/2004 | Kanie | |
| 6,913,280 B2 * | 7/2005 | Dominissini et al. | 280/728.2 |
| 7,001,128 B2 * | 2/2006 | Kuntze | 411/508 |
| 7,581,750 B2 * | 9/2009 | Hirata et al. | 280/730.1 |
| 8,316,514 B2 * | 11/2012 | Sano | 24/297 |
| 2011/0113598 A1 * | 5/2011 | Hofmann et al. | 24/458 |

FOREIGN PATENT DOCUMENTS

JP  2008-30595 A  2/2008

\* cited by examiner

CLIP STRUCTURE AND HOLDING STRUCTURE FOR INTERIOR MEMBER OF VEHICLE

FIELD OF TECHNOLOGY

This invention relates to a clip structure for detachably attaching an attached body to an attaching body, and a holding structure for an interior member of a vehicle for removably attaching an interior member to an exterior member.

BACKGROUND ART

As for a clip for placing an attached member relative to a body, a clip comprising a clip main body which is attached to a rib of the attached member and also inserted and fixed to an attachment hole of a body panel, is well-known (for example, see Patent Document 1). In this clip, by detaching the rib from the clip main body, the attached member can be removed from the body in a state wherein the clip main body remains to be inserted into the attachment hole of the body panel.
Patent Document 1: Japanese Unexamined Patent Publication No. H11-30214

DISCLOSURE OF THE INVENTION

Problems to be Solved by the Invention

However, in the above-mentioned conventional technology, it was necessary to provide the rib in the attached member, so that there were many restrictions.

An object of the present invention is to obtain a clip structure enabling to prevent components from falling off an attaching body or an attached body with a simple structure. Also, the object of the present invention is to obtain a holding structure for an interior member of a vehicle which can prevent the components from falling off an exterior member or an interior member with a simple structure.

Means for Solving the Problems

A clip structure according to a first aspect of the present invention comprises a first clip which is attached to an attaching body and whose at least one portion is a removable portion detachable from the above-mentioned attaching body, and a second clip which is connected to the removable portion while sandwiching an attached member between the second clip and the removable portion of the above-mentioned first clip. A load required for releasing a connection between the above-mentioned removable portion and the second clip is set larger than a predetermined load required for detaching the removable portion from the above-mentioned attaching body.

According to the above-mentioned aspect, the first clip sandwiching an attached body between the first clip and the second clip is attached to the attaching body, so that the attached body is held in the attaching body. In this held state, if a load with a predetermined load or above acts on the attached body in a direction detaching from the attaching body, before the connection between the removable portion which is one portion or the whole of the first clip and the second clip is released (detached, broken), the removable portion is detached from the residual portion of the clip member or the attaching body. Thereby, the attached body is removed from the attaching body while being sandwiched between the second clip and the removable portion.

Specifically, in the structure wherein the removable portion is the whole of the first clip, the first clip and the second clip are maintained in the state sandwiching the attached body, and the removable portion is prevented from falling off the attached body. Also, in the structure wherein the removable portion is one portion of the first clip, the removable portion and the second clip are maintained in the state sandwiching the attached body, and the removable portion is prevented from falling off the attached body. Also, the residual portion of the first clip is maintained in the state held in the attaching body.

Thus, the clip structure according to the first aspect of the present invention can prevent components from falling off the attaching body or the attached body with a simple structure.

In the above-mentioned aspect, the structure may include a clip main body which is connected to the above-mentioned attaching body and also wherein a load required for releasing the connection is set larger than the above-mentioned predetermined load; and the above-mentioned removable portion which is connected to the clip main body and also released from the connection by the above-mentioned predetermined load.

According to the above-mentioned aspect, the first clip is constituted by including the clip main body and the removable portion of another member from the clip main body. A connection-releasing (detaching, breaking) load between the removable portion and the second clip, is set large relative to a detaching load between the removable portion and the clip main body. Thereby, a load setting and management can be easily carried out by the removable portion provided between the clip main body and the second clip.

A holding structure for an interior member of a vehicle according to a second aspect of the present invention comprises an exterior member constituting the vehicle and including an attachment hole; the interior member provided on a vehicle interior side relative to the above-mentioned exterior member and including a through-bore; the first clip attached to the attachment hole of the above-mentioned exterior member and whose at least one portion is the removable portion detachable from the exterior member; and the second clip inserted into the through-bore of the above-mentioned interior member and connected to the removable portion while sandwiching the above-mentioned interior member between the second clip and the removable portion of the above-mentioned first clip. The load required for releasing the connection between the above-mentioned removable portion and the second clip, is set larger than the predetermined load required for detaching the removable portion from the above-mentioned exterior member.

According to the above-mentioned aspect, the first clip, sandwiching the interior member between the first clip and the second clip, is attached to the attachment hole of the exterior member, so that the interior member is held in the exterior member. In this state, if a load with a predetermined load or above acts on the interior member in a direction detaching from the exterior member, before the connection between the second clip and the removable portion which is one portion or the whole of the first clip is released (detached, broken), the removable portion is detached from the residual portion of the clip member or the exterior member. Thereby, the interior member is removed from the exterior member while being sandwiched between the second clip and the removable portion.

Specifically, in the structure wherein the removable portion is the whole of the first clip, the first clip and the second clip are maintained in the state sandwiching the interior member, and the removable portion is prevented from falling off the interior member. Also, in the structure wherein the removable portion is one portion of the first clip, the removable portion and the second clip are maintained in the state sandwiching the interior member, and the removable portion is prevented from falling off the interior member. Also, the residual portion of the first clip is maintained in the state held in the exterior member.

Thus, the holding structure for the interior member of the vehicle according to the second aspect of the present invention can prevent the components from falling off the exterior member or the interior member with a simple structure.

Also, when the interior member is held in the exterior member, the interior member is set in the exterior member from the state wherein the first clip is attached to the attachment hole of the exterior member, and the second clip is connected to the removable portion of the first clip through the through-bore of the interior member. Consequently, in the holding structure of the interior member of the vehicle, the second clip can be attached while viewing the first clip through the through-bore, so that workability is excellent.

In the above-mentioned aspect, the above-mentioned first clip may be constituted by including the clip main body which is connected to the above-mentioned exterior member and also wherein the load required for releasing the connection is set larger than the above-mentioned predetermined load, and the above-mentioned removable portion which is connected to the clip main body and also released from the connection by the above-mentioned predetermined load.

According to the above-mentioned aspect, the first clip is constituted by including the clip main body and the removable portion of another member from the clip main body. The connection-releasing (detaching, breaking) load between the removable portion and the second clip, is set large relative to the detaching load between the removable portion and the clip main body. Thereby, the load setting and management can be easily carried out by the removable portion provided between the clip main body and the second clip.

The above-mentioned aspect may have a structure additionally comprising an air-bag disposed between the above-mentioned exterior member and the interior member, and gas supply means for supplying gas to the above-mentioned air-bag in a predetermined case, and wherein the above-mentioned predetermined load is set as a load reached by expanding the above-mentioned air-bag between the above-mentioned exterior member and the interior member by receiving gas supply from the above-mentioned gas supply means.

According to the above-mentioned aspect, if the gas supply means is operated, for example, at the time of a crash on the vehicle and the like, the air-bag received the gas supply from the gas supply means expands between the exterior member and the interior member. With the expansion of the air-bag, a load in a direction detaching from the exterior member acts on the interior member, and if the load becomes a predetermined load or above, the interior member is removed from the exterior member while being sandwiched between the second clip and the removable portion. Thereby, in the holding structure for the interior member of the vehicle, the air-bag can expand between the exterior member and the interior member while holding the components in the exterior member and the interior member.

In the above-mentioned aspect, the above-mentioned exterior member and the interior member may constitute a portion including a rear end side of a front-back direction of the vehicle in a ceiling portion of the vehicle, and the above-mentioned air-bag may be a structure of a back window air-bag expanded along a back window of the vehicle by receiving the gas supply from the above-mentioned gas supply means.

According to the above-mentioned aspect, if the air-bag receives the gas supply from the gas supply means, for example, at the time of a crash on the vehicle and the like, the air-bag allows the interior member to be removed from the exterior member by the load accompanied with the expansion, and expands to the vehicle interior side from the rear end side of the ceiling portion. Moreover, the air-bag expands along the back window of the vehicle. Thereby, if the gas supply means is operated, for example, at the time of a crash on a rear face of the vehicle, a backseat passenger can be protected.

Effect of the Invention

The clip structure according to the present invention as explained above, includes an excellent effect of enabling to prevent the components from falling off the attaching body or the attached body. Also, the holding structure for the interior member of the vehicle according to the present invention has an excellent effect of enabling to prevent the components from falling off the exterior member or the interior member with a simple structure.

BEST MODES OF CARRYING OUT THE INVENTION

A clip assembly 11 as a clip structure and a ceiling structure 10 of a rear portion of a vehicle to which a holding structure for an interior member of a vehicle is applied, according to a first embodiment of the present invention, will be explained with reference to FIGS. 1 to 8. Incidentally, arrows FR, UP designated accordingly in each figure show respectively a front direction (traveling direction) and an upper direction of an automobile to which the ceiling structure 10 of the rear portion of the vehicle is applied. First, an overall structure of the ceiling structure 10 of the rear portion of the vehicle will be explained, and after that, the clip assembly 11, which is an essential part of the ceiling structure 10 of the rear portion of the vehicle, will be explained in detail.

(Overall Structure of the Holding Structure for the Interior Member of the Vehicle)

Figure 3:
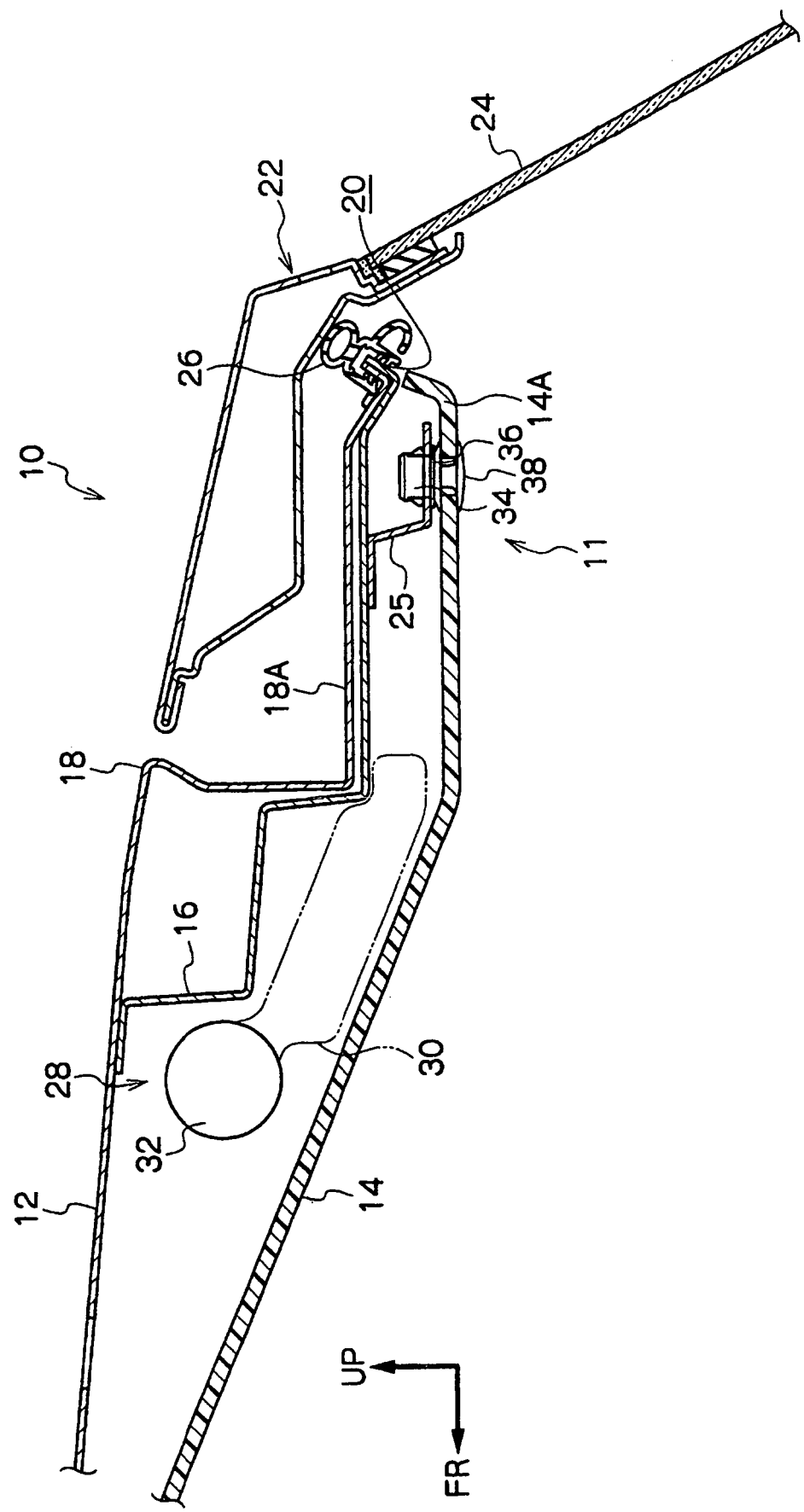
FIG. 3 is a sectional side view of a holding structure for an interior member of a vehicle according to the first embodiment of the present invention.

In FIG. 3, a sectional side view of an overall outline of the ceiling structure 10 of the rear portion of the vehicle is shown. As shown in the figure, in the ceiling structure 10 of the rear portion of the vehicle, a roof head lining 14 as an attached body or an interior member is attached to the inside (downside) of a roof panel 12 as an attaching body or an interior member. A backdoor opening upper frame 16 is jointed on the rear end portion of a front-back direction of the vehicle of the roof panel 12, so that a backdoor opening upper 18, which is a backbone portion of a closed cross-section structure which extends in a vehicle width direction, is formed.

A backdoor opening 20, wherein the backdoor opening upper 18 forms an upper border of an up-down direction of the vehicle, is opened and closed by a backdoor 22 connected to the backdoor opening upper 18 through a hinge which is not shown in the figures. A back window glass 24 as a back window is provided on an upper portion of the backdoor 22. An extending portion 18A extends from the backdoor opening upper 18 toward the backward of the front-back direction of the vehicle, and a weather-strip 26, which seals between the backdoor opening upper 18 and the backdoor 22, is provided on the rear end portion of the front-back direction of the vehicle of the extending portion 18A.

The roof head lining 14 is held in the roof panel 12 with at least a rear end portion 14A thereof by the clip assembly 11 hereinafter described in detail so as to be removable. In this embodiment, a bracket 25 as a body panel (attaching body, exterior member) is fixed to the extending portion 18A of the backdoor opening upper 18. The clip assembly 11 allows the bracket 25 to hold (connect by a clip) the rear end portion 14A of the roof head lining 14.

Also, as shown in FIG. 3, in the ceiling structure 10 of the rear portion of the vehicle, a back window air-bag apparatus 28 is provided between the roof panel 12 and the roof head lining 14. The back window air-bag apparatus 28 comprises a back window air-bag 30 as an air-bag provided between the roof panel 12 and the roof head lining 14 in a folded state, and an inflator 32 constituting gas supply means for supplying gas to the back window air-bag 30.

Figure 4:
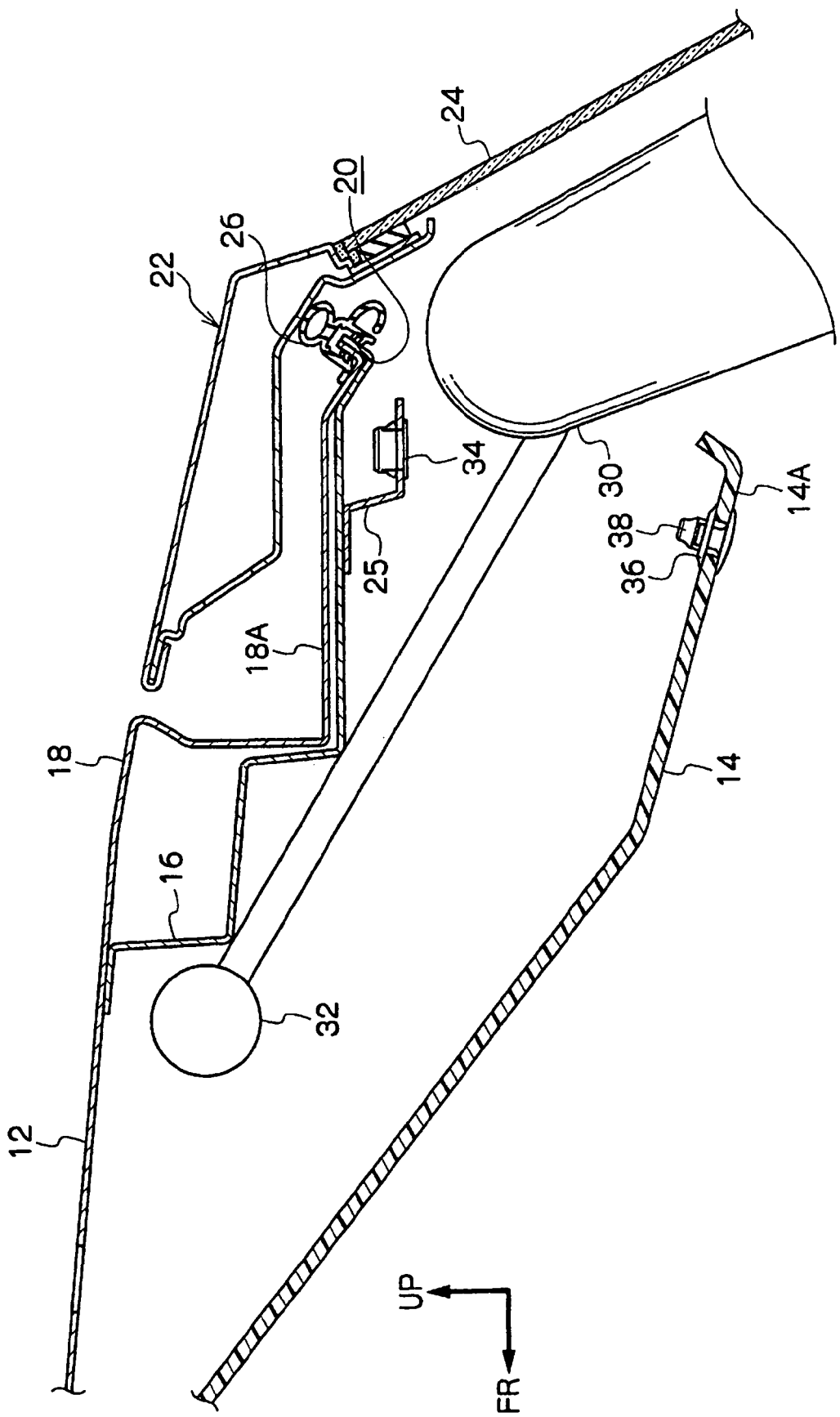
FIG. 4 is a sectional side view of a roof head lining in a detached state relative to a roof panel in the holding structure for the interior member of the vehicle according to the first embodiment of the present invention.

As shown in FIG. 4, by receiving gas supply, the back window air-bag 30 expands downwardly in the up-down direction of the vehicle along the back window glass 24 of the backdoor 22. The inflator 32 is electrically connected to an air-bag ECU as a control apparatus which is not shown in the figure. In a case that the air-bag ECU determined that a crash on a rear face was detected or predicted based on a signal from a crash sensor and the like, the air-bag ECU operates so that the inflator 32 supplies gas to the back window air-bag 30.

In the ceiling structure 10 of the rear portion of the vehicle, with the expansion of the back window air-bag 30 of the back window air-bag apparatus 28, a held state of the roof head lining 14 relative to the roof panel 12 by the clip assembly 11, is released.

(Detailed Structure of the Clip Assembly)

Figure 1:
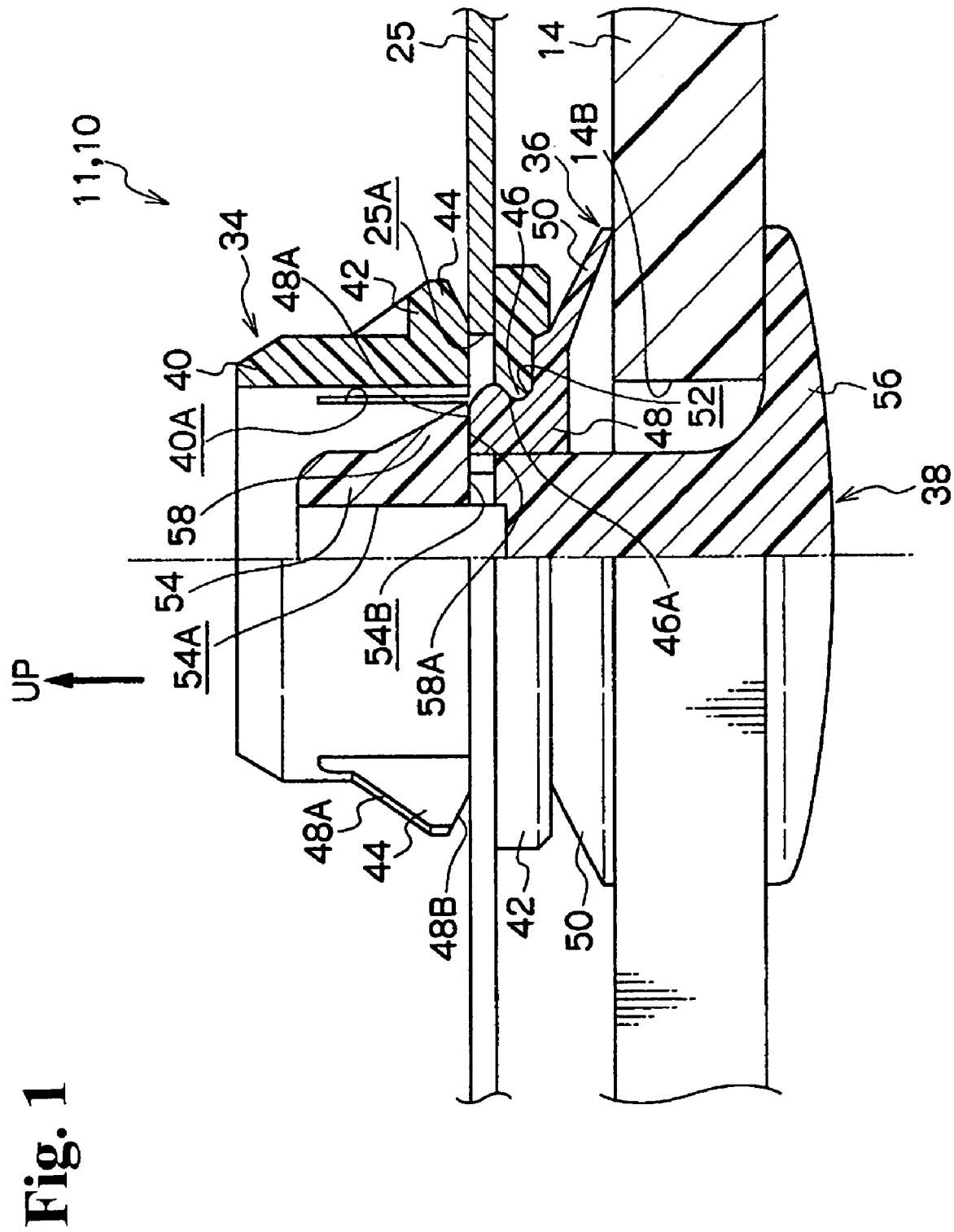
FIG. 1 is an enlarged sectional side view showing essential parts of a ceiling structure of a rear portion of a vehicle according to a first embodiment of the present invention.
Figure 2:
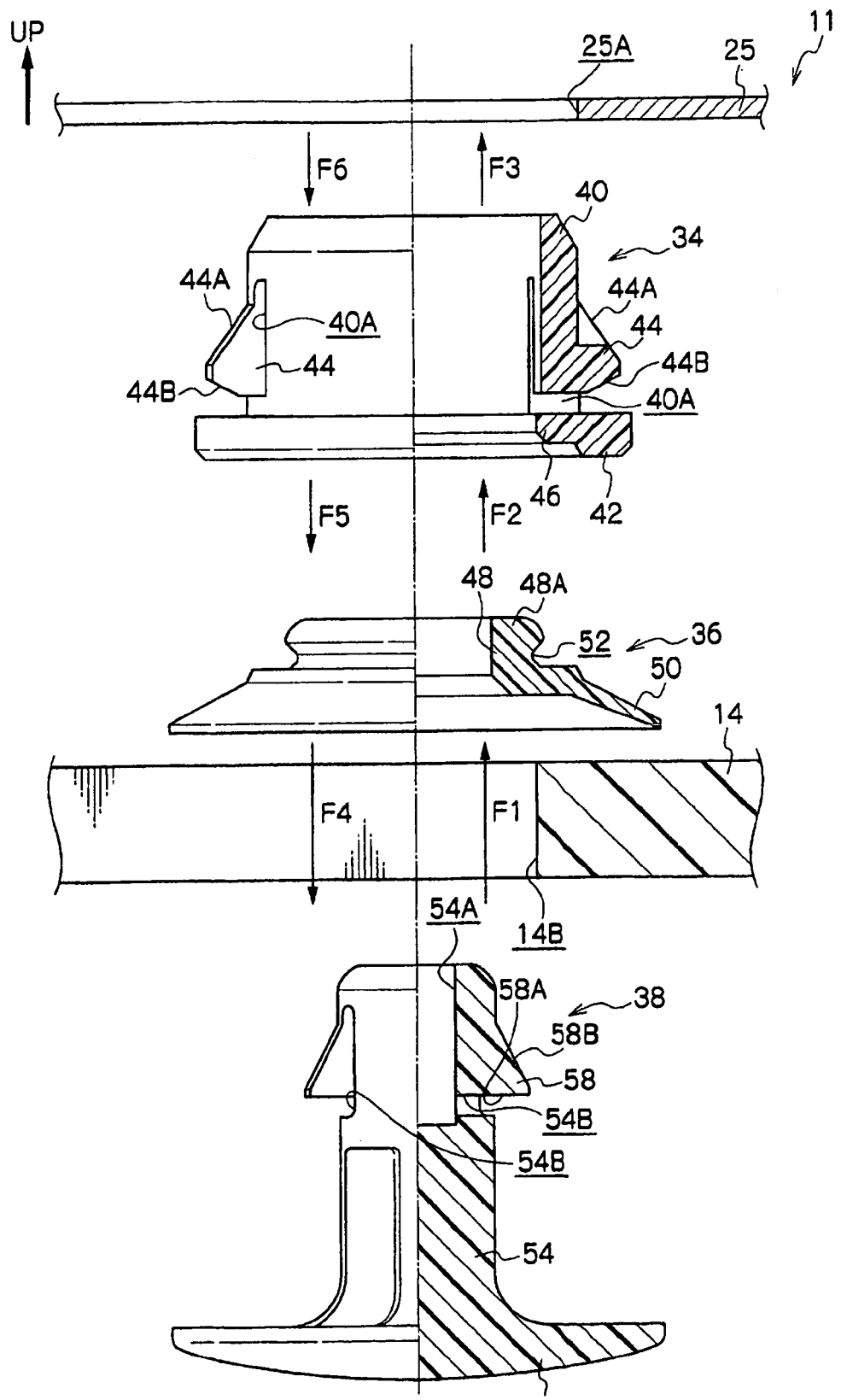
FIG. 2 is an exploded sectional side view showing the essential parts of the ceiling structure of the rear portion of the vehicle according to the first embodiment of the present invention.

As shown in FIGS. 1, 2, the clip assembly 11 is a three-piece structure including a clip 34, a joint 36 connected to the clip 34, and a pin 38 connected to the joint 36. In this embodiment, the clip 34 is locked in the bracket 25, the joint 36 is locked in the downside of the up-down direction of the vehicle of the clip 34, and the pin 38 is locked in the joint 36 by sandwiching the roof head lining 14 between the pin 38 and the joint 36. Incidentally, loads F1 to F6 shown in FIG. 2 show loads required for assembling and detaching (releasing the connection of) the clip 34, joint 36, and the pin 38. Hereinafter, the above will be concretely explained.

Figure 6A:
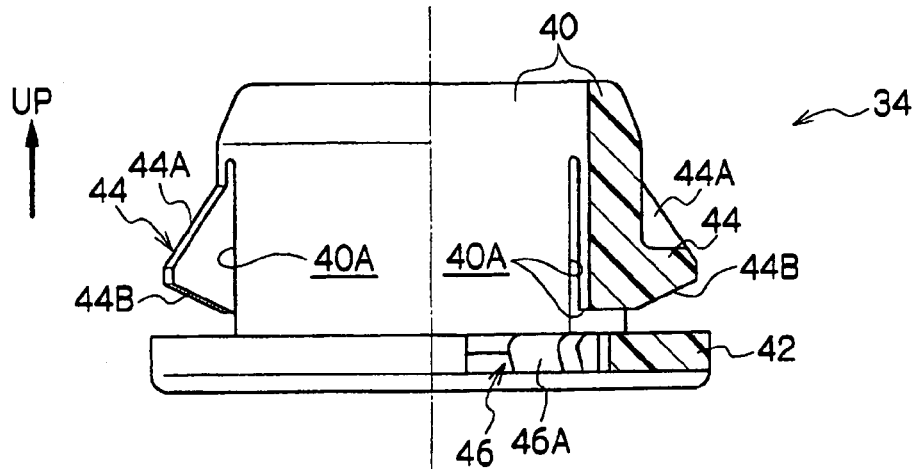
FIG. 6A is a half sectional frontal view showing a clip constituting a clip assembly of the holding structure for the interior member of the vehicle according to the first embodiment of the present invention.
Figure 6B:
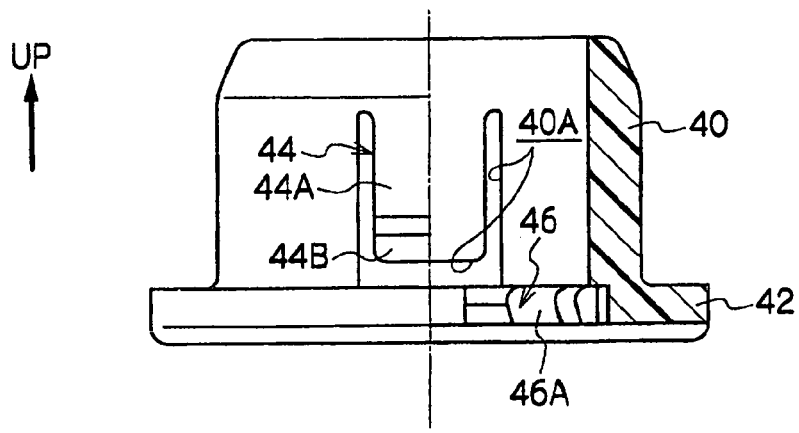
FIG. 6B is a half sectional side view showing the clip constituting the clip assembly of the holding structure for the interior member of the vehicle according to the first embodiment of the present invention.

As shown in FIG. 6A which is a half sectional frontal view of the clip 34, and FIG. 6B which is a half sectional side view of the clip 34, the clip 34 includes a cylindrical portion 40 formed in a cylindrical shape, and a flange portion 42 extended to the outside of a radial direction from one side of an axis direction of the cylindrical portion 40. Also, the clip 34 includes multiple (two in this embodiment) engagement claws 44 outwardly projecting in the radial direction from the cylindrical portion 40. Slits (notches) 40A, respectively forming an approximately C-shape (U-shape) and opening upwardly (an opposite side of a flange portion 42 side), are formed around each engagement claw 44 in the cylindrical portion 40, and penetrate in a thickness (radius) direction. Consequently, each engagement claw 44 is connected to the cylindrical portion 40 only by an upper end portion of the engagement claw 44.

Thereby, the clip 34 can be elastically deformed in a direction wherein each engagement claw 44 proceeds and recedes in the radial direction relative to the cylindrical portion 40, and can pass through a penetration bore 25A formed in the bracket 25 by the elastic deformation. The clip 34 has a structure sandwiching the bracket (body panel) 25 between the engagement claw 44 and the flange portion 42 in a state wherein each engagement claw 44 passes through the penetration bore 25A and is restored. In this embodiment, each engagement claw 44 is not restored up to a free state after passed through the penetration bore 25A, and while elastically deforming, the engagement claw 44 sandwiches the bracket 25 between the engagement claw 44 and the flange portion 42.

As shown in FIG. 6A, each embodiment claw 44 forms an approximately triangular shape in a lateral face view, and has oblique sides 44A, 44B in which both an engagement face of the upper side (opposite side of the flange portion 42) and an engagement face of the lower side are inclined relative to a direction perpendicular to the axis (horizontal face). Thereby, when the clip 34 is assembled to the bracket 25, while contacting the oblique side 44A with a bore border of the penetration bore 25A in the bracket 25, the clip 34 is upwardly pushed in, so that the engagement claw 44 is elastically deformed inwardly in the radial direction, and passes through the penetration bore 25A. On the other hand, when the clip 34 is removed from the bracket 25, while contacting the oblique side 44B with the bore border of the penetration bore 25A in the bracket 25, the clip 34 is downwardly pulled down, so that the engagement claw 44 is elastically deformed inwardly in the radial direction, and passes through the penetration bore 25A.

Specifically, the clip 34 has a structure in which a portion of a moving force in an axis direction of the clip 34 is converted to a moving force in a radial direction of the engagement claw 44 by the oblique sides 44A, 44B. In the clip 34 according to this embodiment, the oblique side 44B forms an angle smaller than that of the oblique side 44A in the direction perpendicular to the axis (horizontal face). Consequently, the attaching load F3 when the clip 34 is mounted on the bracket 25 is smaller than the holding load F6 when the clip 34 is removed (detached) from the bracket 25, so that a holding performance (holding load F6) and assembly workability (attaching load F3) are compatible.

Figure 6C:
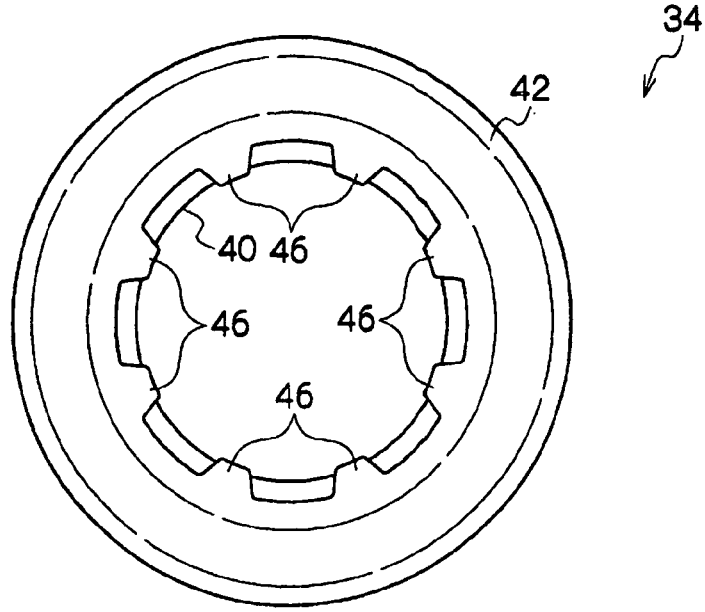
FIG. 6C is a bottom plan view showing the clip constituting the clip assembly of the holding structure for the interior member of the vehicle according to the first embodiment of the present invention.

Additionally, as shown in FIGS. 6B, 6C, the clip 34 includes multiple engagement claws 46 inwardly projecting in the radial direction from an inner border portion of an end portion on an installation side of the cylindrical portion 40 in the flange portion 42. The multiple engagement claws 46 are disposed in a circumferential direction of the flange portion 42 with an approximately equal interval. Each engagement claw 46 includes an R face 46A whose end is rounded so that the central portion in the axis direction of the clip 34 projects the most to the inside of the radial direction (the inner diameter becomes the smallest). The engagement claw 46 engages an engagement groove 52 (hereinafter described) of the joint 36.

Figure 7A:
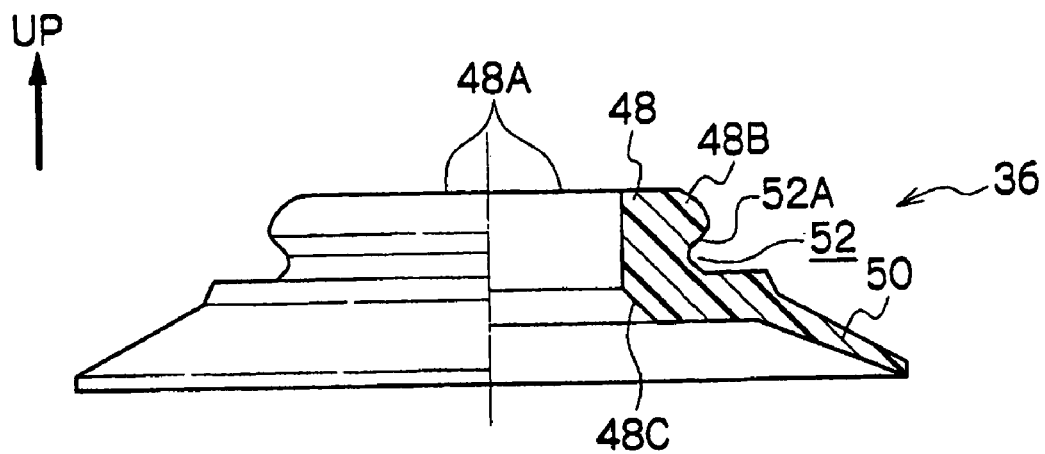
FIG. 7A is a half sectional frontal view showing a joint constituting the clip assembly of the holding structure for the interior member of the vehicle according to the first embodiment of the present invention.
Figure 7B:
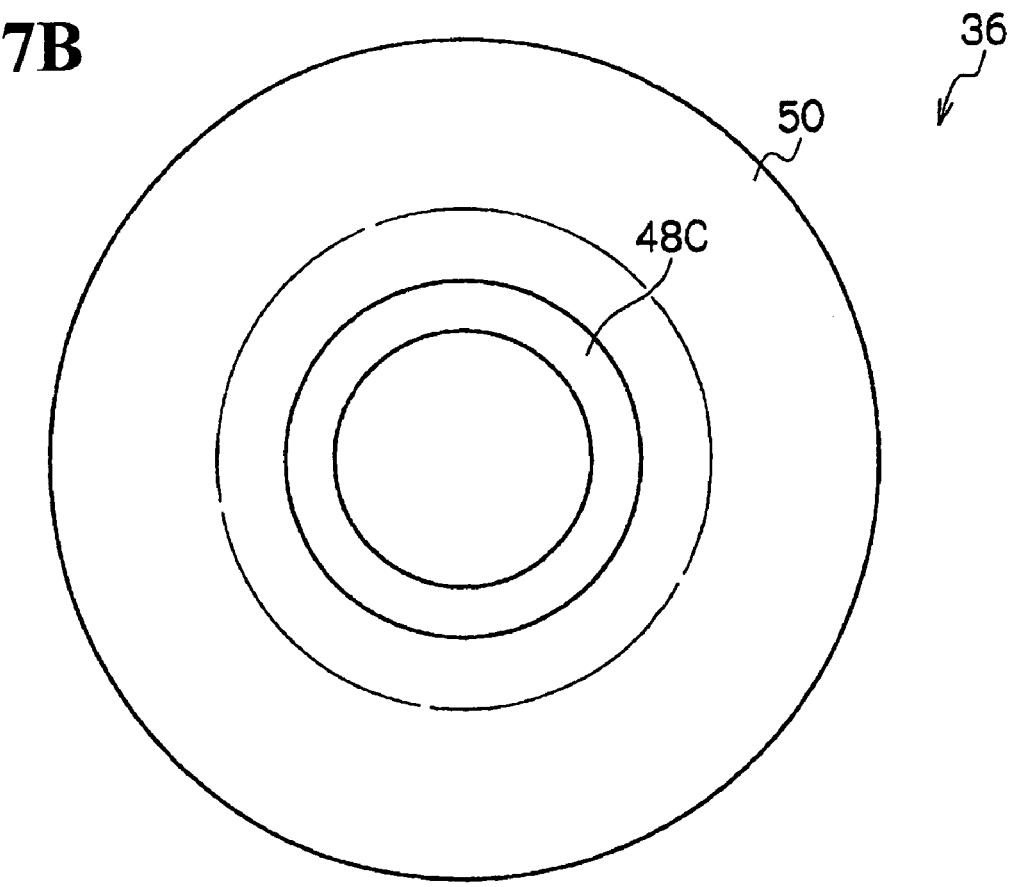
FIG. 7B is a bottom plan view showing the joint constituting the clip assembly of the holding structure for the interior member of the vehicle according to the first embodiment of the present invention.

As shown in FIGS. 7A, 7B, the joint 36 includes a short cylindrical portion 48 which is formed in a short cylindrical shape and whose outer diameter corresponds to an inner diameter of the cylindrical portion 40; and a flange portion 50 which extends to the outside of a radial direction from one side of an axis direction of the short cylindrical portion 48. The engagement groove 52, outwardly opening in the radial direction, is formed in the short cylindrical portion 48. In this embodiment, the engagement groove 52 is a circular groove formed around an entire circumference of the short cylindrical portion 48. Also, an end face of the opposite side of the flange portion 50 in the short cylindrical portion 48 is an engagement face 48A in which an engagement claw 58 (hereinafter described) of the pin 38 engages.

An outer circumferential portion of the short cylindrical portion 48 has an R face 48B which is rounded so that the central portion in the axis direction of the joint 36 has the largest diameter, from a groove wall of the engagement groove 52 to the engagement face 48A. Thereby, when the joint 36 is connected to the clip 34, if the joint 36 is pressed against the R face 46A of each engagement claw 46 of the clip 34 in an axis direction of the R face 48B, a portion of a pressing force (moving force) in the axis direction is converted to a pressing force in a radial direction of the short cylindrical portion 48 and the multiple engagement claws 46. By this force, at least one of the short cylindrical portion 48 or the multiple engagement claws 46 is deformed in the radial direction; so that the short cylindrical portion 48 can be inserted into the cylindrical portion 40 of the clip 34. Also, by the insertion of the short cylindrical portion 48 into the cylindrical portion 40, the multiple engagement claws 46 are entered into the engagement groove 52, so that the engagement groove 52 and the multiple engagement claws 46 are engaged in the axis direction.

Then, as mentioned hereinafter, each engagement claw 46 of the clip 34 and the engagement groove 52 of the joint 36 are set in a shape of a size such that the holding load F5, required for detaching the joint 36 from the clip 34, i.e., the bracket 25, becomes sufficiently smaller than the holding load F6 of the clip 34 relative to the above-mentioned bracket 25. In this embodiment, the holding load F5 is set by an inclined angle of a groove wall 52A (see FIG. 7A) of the upper side (clip 34 side) of the engagement groove 52 in the short cylindrical portion 48; an engagement depth of each engagement claw 46 relative to the engagement groove 52; R of the R face 46A; and the like. The clip assembly 11 as a whole can be set such that the inclined angle of the oblique side 44B of each engagement claw 44 constituting the clip 34 so that the holding load F6 becomes sufficiently large relative to the holding load F5. Incidentally, the attaching load f2 of the joint 36 relative to the clip 34 is set independently from the holding load F5 in (a shape of the size of) each engagement claw 46 of the clip 34 and the engagement groove 52 of the joint 36.

Also, both upper and lower faces of the flange portion 50 of the joint 36 are formed in a conical shape whose diameter gradually expands toward the opposite side of the short cylindrical portion 48 of the axis direction, and are constituted as a disc spring portion elastically deforming in the axis direction. In this embodiment, the flange portion 50 has a structure sandwiching the roof head lining 14 between the flange portion 50 and the pin 38 (a flange portion 56 hereinafter described) in a compressive deformation state.

Figure 8A:
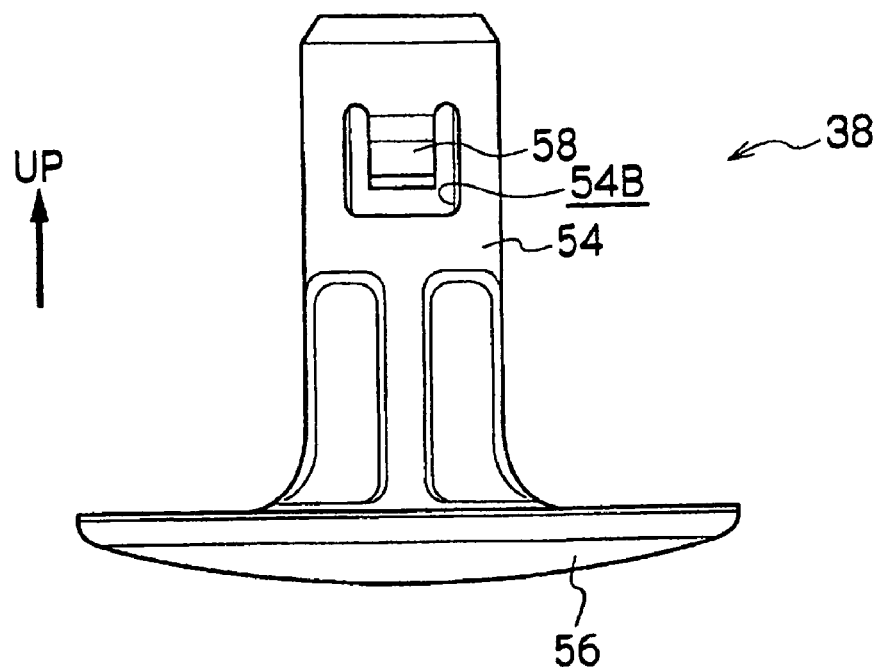
FIG. 8A is a front view showing a pin constituting the clip assembly of the holding structure for the interior member of the vehicle according to the first embodiment of the present invention.
Figure 8B:
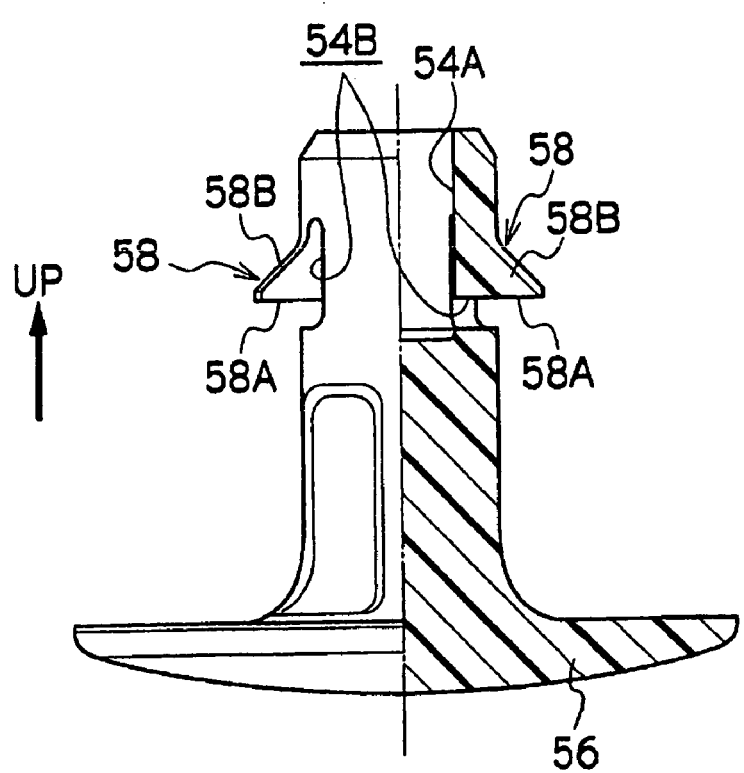
FIG. 8B is a half sectional side view showing the pin constituting the clip assembly of the holding structure for the interior member of the vehicle according to the first embodiment of the present invention.
Figure 8C:
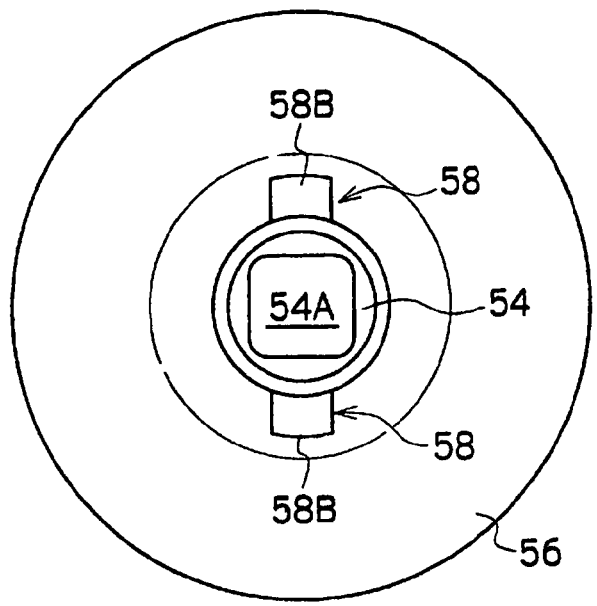
FIG. 8C is a plan view showing the pin constituting the clip assembly of the holding structure for the interior member of the vehicle according to the first embodiment of the present invention.

As shown in FIGS. 8A to 8C, the pin 38 includes an axis portion 54 which is formed in an approximately columnar shape whose outer diameter corresponds to an inner diameter of the short cylindrical portion 48, and the flange portion 56 which extends to the outside of a radial direction from one side of an axis direction of the axis portion 54. As shown in FIGS. 8B, 8C, a square hole 54A with an approximately short shape in a plan view is formed in one portion of a free end side of the opposite side of the flange portion 56 in the axis portion.

Also, as shown in FIGS. 8A, 8B, the pin 38 includes multiple (two in this embodiment) engagement claws 58 outwardly projecting in the radial direction from a forming portion of the square hole 54A in the axis portion 54. Slits (notches) 54B, respectively forming an approximately C-shape (U-shape) and opening upwardly (an opposite side of a flange portion 56 side), are formed around each engagement claw 58 in the axis portion 54, and penetrate in a thickness direction up to the square hole 54A. Consequently, each engagement claw 58 is connected to the axis portion 54 (a hole wall portion of the square hole 54A) only by an upper end portion of the engagement claw 58.

Thereby, the pin 38 can be elastically deformed in a direction wherein each engagement claw 58 proceeds and recedes in the radial direction (square hole 54A) relative to the axis portion 54, and can pass through the inside of the short cylindrical portion 48 of the joint 36 by the elastic deformation. The pin 38 has a structure sandwiching the roof head lining 14 between the flange portion 56 and the flange portion 50 of the clip 34 while engaging an engagement face 58A of the engagement claw 58 with the engagement face 48A of the clip 34 in a state wherein each engagement claw 58 passes through the joint 36 and is restored.

Incidentally, in this assembled state, as shown in FIG. 1, the axis portion 54 of the pin 38 is penetrated through a through-bore 14B of the roof head lining 14. The hole diameter of the through-bore 14B has a size in which each engagement claw 58 does not interfere with the penetration of the axis portion 54, and is set smaller than the outer diameter of the flange portion 50 and the flange portion 56. Also, in this assembled state, at least one of the roof head lining 14 or the flange portion 50 is compressed in the axis (thickness) direction. In other words, an interval between the flange portion 56 and each engagement claw 58 is smaller than the sum of the thickness of the flange portion 50 and the thickness of the roof head lining 14 in a free state.

As shown in FIG. 8B, the engagement face 58A of each engagement claw 58 is a plane face along a direction perpendicular to the axis (horizontal face) of the axis portion 54. Consequently, the pin 38 has a structure which cannot be basically removed (detached without breaking) from the joint 36 from the state wherein the engagement face 58A of each engagement claw 58 is engaged with the engagement face 48A of the clip 34 as shown in FIG. 1. In other words, the holding load F4 of the pin 38 relative to the joint 36 is set sufficiently large relative to each holding load F5, F6 (F4>F6>F5).

On the other hand, an engagement face of the upper side (opposite side of the flange portion 56) in each engagement claw 58 is an oblique side 58B inclined relative to a direction perpendicular to the axis (horizontal face). Thereby, when the pin 38 is assembled to the joint 36, while contacting the oblique side 58B with an inner border of the short cylindrical portion 48, the pin 38 is upwardly pushed in, so that each engagement claw 58 is elastically deformed inwardly in the radial direction, and passes through the inside of the short cylindrical portion 48. The attaching load F1 of the pin 38 relative to the joint 36 is set by an inclined angle of the oblique side 58B. Each attaching load F1 to F3 is set accordingly (independently from the holding loads F4 to F6) in view of the assembly workability of the roof head lining 14 relative to the roof panel 12 and the like. Incidentally, in this embodiment, a contacting portion of the oblique side 58B in the short cylindrical portion 48 is a taper face 48C (see FIG. 7A).

The clip 34, the joint 36, and the pin 38 of the above-explained clip assembly 11 are respectively constituted by a resin material such as, for example, polyacetal (POM) and the like. Incidentally, in the present embodiment, the clip 34 and the joint 36 constitute a first clip in the present invention. The clip 34 corresponds to a clip main body, and the joint 36 corresponds to a removable portion. Also, the pin 38 corresponds to a second clip in the present invention.

Next, operations of the first embodiment will be explained.

Figure 5:
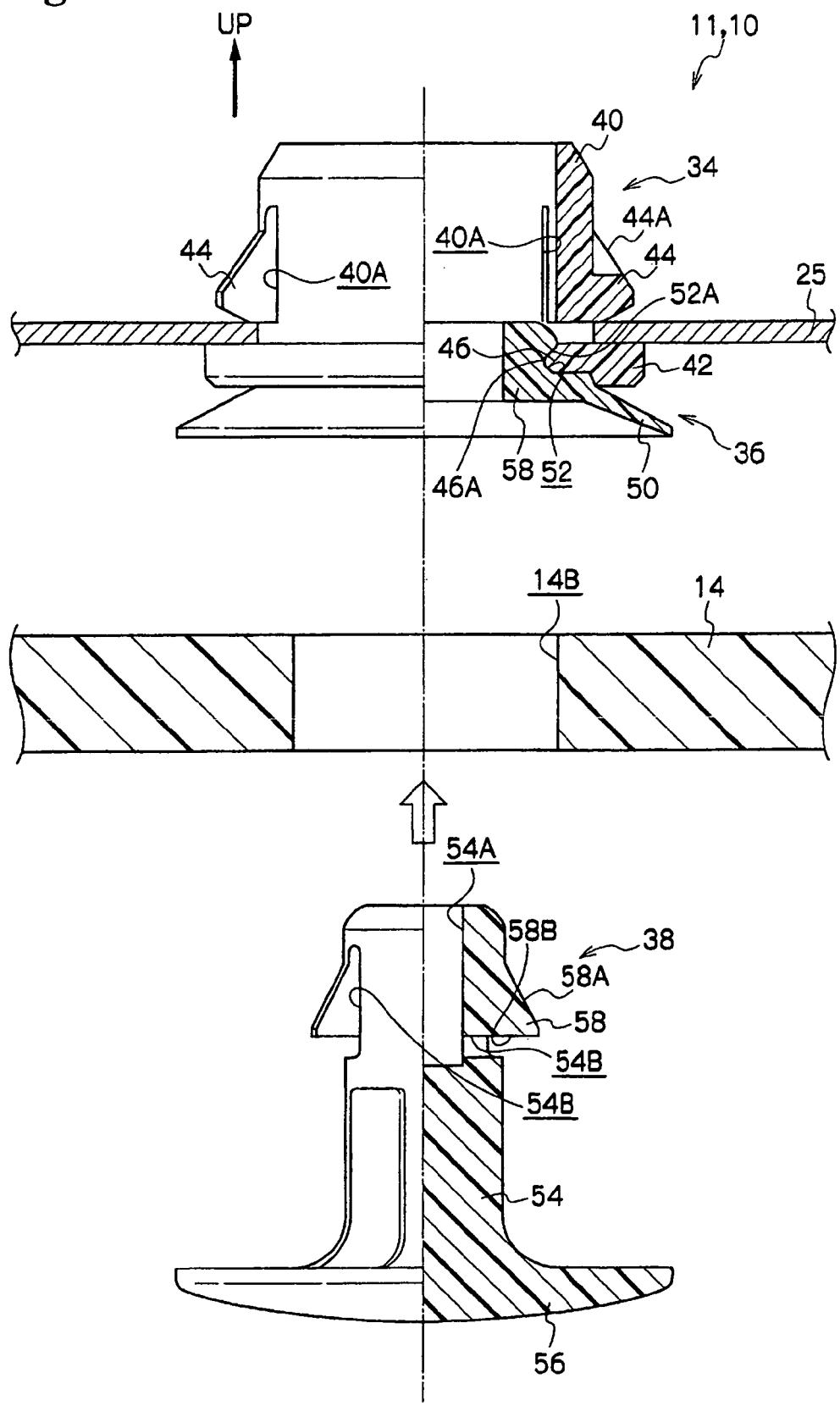
FIG. 5 is a sectional side view for explaining an assembly process of the roof head lining relative to the roof panel by the ceiling structure of the rear portion of the vehicle according to the first embodiment of the present invention.

In the ceiling structure 10 of the rear portion of the vehicle with the above-mentioned structure, when the rear end portion 14A of the roof head lining is fixed relative to the roof panel 12, at first, as shown in FIG. 5, the clip 34 in which the joint 36 is attached by the attaching load F2 is attached to the bracket 25. Specifically, while abutting the oblique side 44A of each engagement claw 44 against the bore border of the penetration bore 25A, the clip 34 is pushed upwardly in the up-down direction of the vehicle by a load with the attaching load F3 or above. Then, a portion of the load is converted to a load in a radial direction, and while the engagement claw 44 is being recessed to the inward of the cylindrical portion 40, the engagement claw 44 passes through the penetration bore 25A of the bracket 25. After that, when the engagement claw 44 is restored in a predetermined range, the bracket 25 is elastically sandwiched between the engagement claw 44 and the flange portion 42, and the clip 34 is attached to the bracket 25.

Next, the position of the roof head lining 14 is adjusted, and the position of the through-bore 14B formed in the rear end portion 14A of the roof head lining 14 is matched to the position of the joint 36. Then, while maintaining this matched state, the axis portion 54 of the pin 38 is inserted into the joint 36 which is attached to the clip 34 through the through-bore 14B of the roof head lining 14. Thereby, the roof head lining 14 is held in the roof panel 12 with one touch of a button.

More specifically, while abutting the oblique side 58B against the taper face 48C, the pin 38 is pushed upwardly in the up-down direction of the vehicle by a load with the attaching load F1 or above. Then, a portion of the load is converted to a load in a radial direction, and while the engagement claw 58 is being recessed to the inward of the square hole 54A in the axis portion 54, the engagement claw 58 passes through the short cylindrical portion 48 of the joint 36. After that, when the engagement claw 58 is restored, the engagement face 58A of the engagement claw 58 is engaged with the engagement face 48A of the clip 34, and as shown in FIG. 1, the roof head lining 14 is held in the roof panel 12. In this held state, since the flange portion 50 of the joint 36 is elastically deformed, the rear end portion 14A of the roof head lining 14 is held in the roof panel 12 by the clip assembly 11 without wobbling.

When a rear face of a vehicle of the automobile and the like, to which the ceiling structure 10 of the rear portion of the vehicle is applied, is crashed, the air-bag ECU operates the inflator 32. When the gas which the inflator 32 generates is supplied to the back window air-bag 30, the back window air-bag 30 inflates and expands. As the back window air-bag 30 expands between the roof panel 12 and the roof head lining 14, a load in a direction being detached downwardly relative to the roof panel 12 acts on the roof head lining 14. When this load exceeds the minimum holding load F5 among the holding loads by the clip assembly 11, the joint 36 is detached from the clip 34, i.e., the bracket 25.

Thereby, as shown in FIG. 4, while the rear end portion 14A of the roof head lining 14 is sandwiched between the joint 36 and the pin 38, the rear end portion 14A is separated from the roof panel 12. Then, the back window air-bag 30 projects to a vehicle interior side from a space between the rear end portion 14A and the roof panel 12 (backdoor opening upper 18), and expands along the backdoor 22. Thereby, the head of a backseat passenger is protected against a crash on the rear face.

Here, in the ceiling structure 10 of the rear portion of the vehicle and the clip assembly 11, the holding load F5 is the minimum among the holding load F6 of the clip 34 relative to the bracket 25, the holding load F5 of the joint 36 relative to the clip 34, and the holding load F4 of the pin 38 relative to the joint 36. Consequently, in the case that a downward load of the roof head lining 14 acts, as mentioned above, the connection of the joint 36 relative to the clip 34 is released. Thereby, the state, wherein the roof head lining 14 is sandwiched between the joint 36 and the pin 38, is maintained, so that components of the clip assembly 11 are never detached from the roof panel 12 (bracket 25) and the roof head lining 14, and never fly apart inside a vehicle interior.

Also, the ceiling structure 10 of the rear portion of the vehicle and the clip assembly 11 have the three-piece structure comprising the clip 34, the joint 36, and the pin 38. Thereby, without detaching the clip 34 from the bracket 25, a structure in which the roof head lining 14 is sandwiched between the joint 36 and the pin 38 can be realized. Consequently, the minimum holding load F5 for properly expanding the back window air-bag 30 can be set by a resin two-piece (the clip 34 and the joint 36), so that a load setting and management are easy.

Moreover, in the ceiling structure 10 of the rear portion of the vehicle and the clip assembly 11, at the end of an assembling operation, the pin 38 is inserted into the joint 36 through the through-bore 14B from the lower side (vehicle interior side) of the roof head lining 14. Consequently, while viewing the position of the joint 36 through the through-bore 14B, the assembling operation can be carried out. Specifically, the operation of allocating the roof head lining 14 so as to match the position of the through-bore 14B of the roof head lining 14 to the position of the joint 36, becomes easy.

Incidentally, in the above-mentioned first embodiment, although an example of F4>F6>F5 is shown, the present invention is not limited to the above, and, for example, F4>=F6>F5 may be possible. Even in this structure, in the case that a downward load accompanied with the expansion of the back window air-bag 30 acts on the roof head lining 14, the connection of the joint 36 relative to the clip 34 is released. Consequently, at the time of being detached from the roof panel 12 of the roof head lining 14, the state sandwiching the roof head lining 14 by the joint 36 and the pin 38 is maintained, so that the components of the clip assembly 11 never fly apart. In this structure, for example, the structure, wherein the engagement face 58A of each engagement claw 58 is made as an inclined face which is inclined relative to a direction perpendicular to the axis of the axis portion 54, may be possible, so that the pin 38 can be removed from the joint 36.

(Second Embodiment)

Figure 9A:
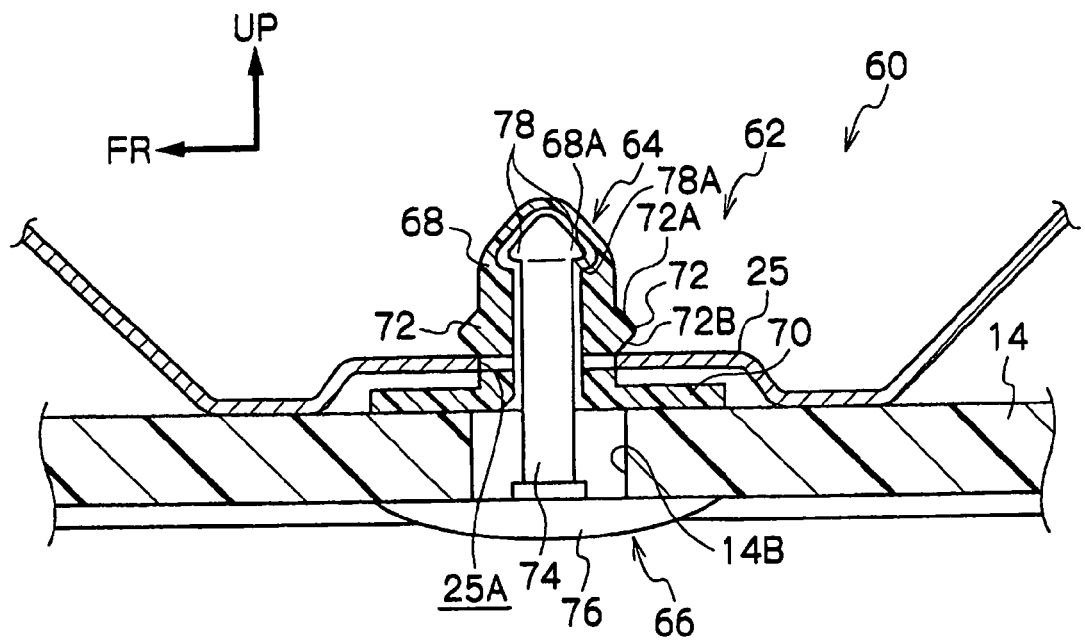
FIG. 9A is a sectional side view of an assembled state of the roof head lining relative to the roof panel showing enlarged essential parts of the ceiling structure of the rear portion of the vehicle according to a second embodiment of the present invention.

Next, a clip assembly 62 as the clip structure, and a ceiling structure 60 of the rear portion of the vehicle to which the holding structure for the interior member of the vehicle is applied according to a second embodiment of the present invention, will be explained with reference to FIGS. 9A, 9B. In FIG. 9A, essential parts of the clip assembly 62 constituting the ceiling structure 60 of the rear portion of the vehicle, are shown in a sectional side view. As shown in this figure, since the clip assembly 62 has a two-piece structure of a clip 64 and a pin 66, the clip assembly 62 differs from the clip assembly 11 according to the first embodiment.

The clip 64 includes a bag portion 68 formed in a bag shape, and a flange portion 70 outwardly extended in a radial direction from an opening end of the bag portion 68. On a periphery portion of the bag portion 68, engagement claws 72, engaging the upper face around the penetration bore 25A in the bracket 25, are provided. As with the engagement claws 44, 58, the upper end side of the engagement claws 72 is connected to the bag portion 68, and the lower end of the engagement claws 72 is a free end. The lower end is formed as a leaf spring portion positioned away from the radial direction relative to the bag portion 68. When the engagement claws 72 pass through the penetration bore 25A of the bracket 25 from the lower side, the engagement claws 72 are recessed while engaging oblique sides 72A of the upper side with the bore border of the penetration bore 25A. The engagement claws 72 have a structure retaining the bag portion 68 in an axis direction relative to the bracket 25 by being restored after passing through the penetration bore 25A, and by engaging with the upper face of the bracket 25. Also, if a downward load of the holding load F5 or above acts on the clip 64, the engagement claws 72 are recessed while engaging oblique sides 72B of the lower side with the bore border of the penetration bore 25A so as to enable to pass through the penetration bore 25A.

In the clip assembly 62, the holding load F5 required for detaching the clip 64 from the bracket 25 is set so that the roof head lining 14 is detached from the roof panel 12 and the back window air-bag 30 properly expands. In this embodiment, the holding load F5 is set in a required value by mainly regulating a bore diameter of the penetration bore 25A, and sizes, materials, and the like of the bag portion 68 and the engagement claws 72.

Also, inside the bag portion 68, an engagement face 68A, which faces upwardly along a direction perpendicular to the axis, is formed by expanding the inner diameter of a sealing end (upper end) side.

The pin 66 includes an axis portion 74 and a flange portion 76 outwardly extended in a radial direction from one end portion of an axis direction of the axis portion 74. On the end of the axis portion 74, multiple (two in this embodiment) engagement claws 78 are formed by jutting outwardly in the radial direction. The engagement claws 78 engage engagement faces 78A which face downwardly (face a flange portion 76 side) with the engagement face 68A of the clip 64, so that the pin 66 is held in the clip 64.

In this state, the roof head lining 14 is sandwiched between the flange portion 70 of the clip 64 and the flange portion 76 of the pin 66. In the clip assembly 62, in order to elastically sandwich the roof head lining 14 between the flange portions 70, 76, at least one of the flange portions 70, 76 may be formed in a disc spring shape such as the flange portion 50.

Then, in the clip assembly 62 and the ceiling structure 60 of the rear portion of the vehicle, the holding load F4 of the pin 66 relative to the clip 64 is set sufficiently large relative to the holding load F5 (F4>F5) of the clip 64 relative to the above-mentioned bracket 25. Therefore, in this embodiment, the clip 64 corresponds to the first clip in the present invention, and approximately the whole clip 64 corresponds to the removable portion. Also, the pin 66 corresponds to the second clip in the present invention. Other structures of the ceiling structure 60 of the rear portion of the vehicle and the clip assembly 62 are the same as the structures corresponding to the ceiling structure 10 of the rear portion of the vehicle and the clip assembly 11.

Next, operations of the second embodiment will be explained.

In the ceiling structure 60 of the rear portion of the vehicle with the above-mentioned structure, when the rear end portion 14A of the roof head lining is fixed relative to the roof panel 12, at first, the clip 64 is attached to the bracket 25. Specifically, while abutting each engagement claw 72 against the bore border of the penetration bore 25A, the clip 64 is pushed upwardly in the up-down direction of the vehicle by a load with a required attaching load or above. Then, a portion of the load is converted to a load in a radial direction, and while the engagement claw 72 is being recessed, the engagement claw 72 passes through the penetration bore 25A of the bracket 25. After that, when the engagement claw 72 is restored, the bracket 25 is sandwiched between the engagement claw 72 and the flange portion 70, so that the clip 64 is attached to the bracket 25.

Next, the position of the roof head lining 14 is adjusted, and the position of the through-bore 14B formed in the rear end portion 14A of the roof head lining 14 is matched to the position of the clip 64. Then, while maintaining this matched state, the axis portion 74 of the pin 66 is inserted into the bag portion 68 of the clip 64 through the through-bore 14B of the roof head lining 14. Thereby, the roof head lining 14 is held in the roof panel 12 with one touch of a button.

When the rear face of the vehicle of the automobile and the like, to which the ceiling structure 60 of the rear portion of the vehicle is applied, is crashed, the air-bag ECU operates the inflator 32. When the gas which the inflator 32 generates is supplied to the back window air-bag 30, the back window air-bag 30 inflates and expands. As the back window air-bag 30 expands between the roof panel 12 and the roof head lining 14, a load in a direction being detached downwardly relative to the roof panel 12 acts on the roof head lining 14. When this load exceeds the minimum holding load F5 among the holding loads by the clip assembly 62, the clip 64 is detached from the bracket 25.

Figure 9B:
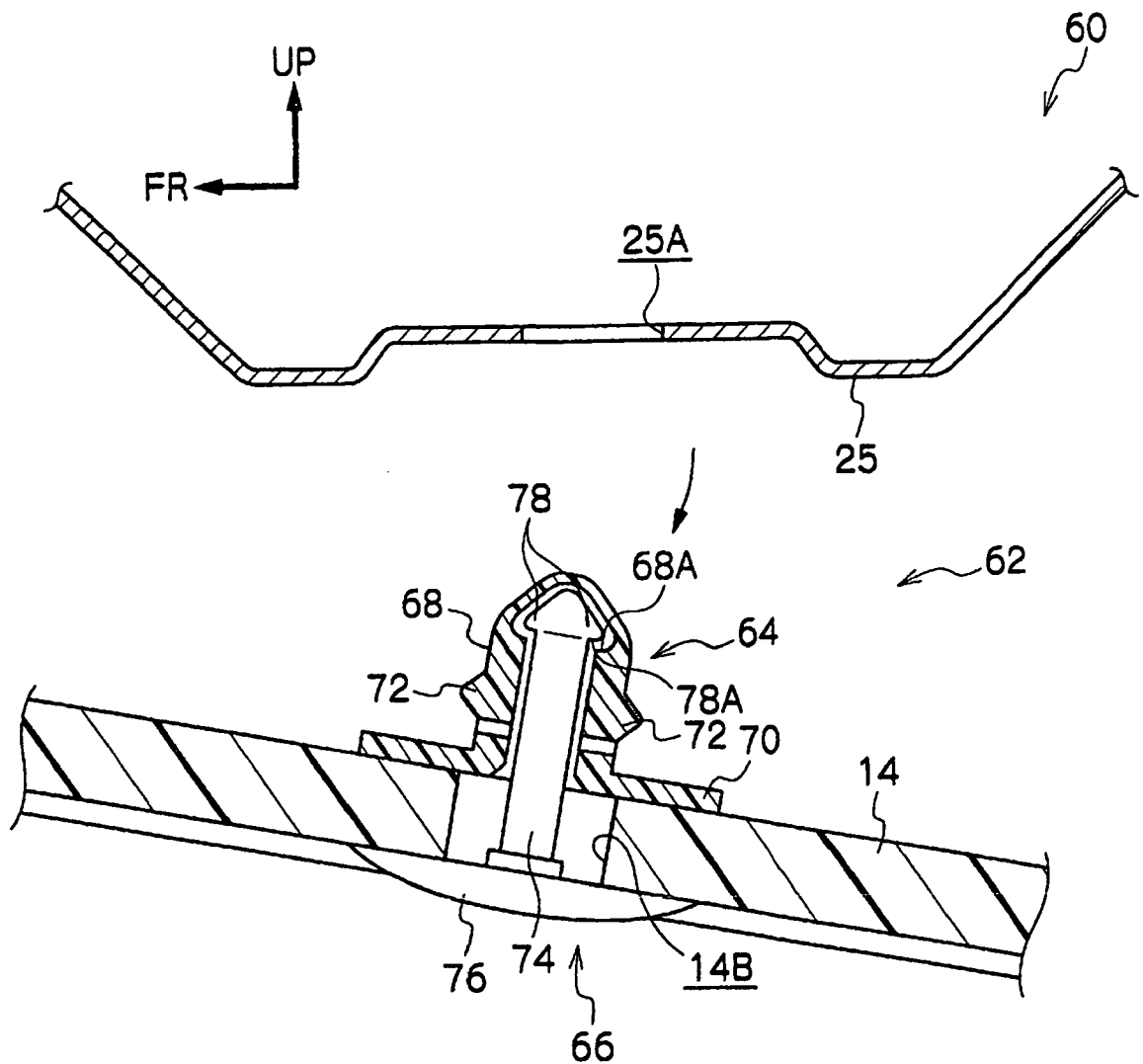
FIG. 9B is a sectional side view of the detached state of the roof head lining relative to the roof panel showing the enlarged essential parts of the ceiling structure of the rear portion of the vehicle according to the second embodiment of the present invention.

Thereby, as shown in FIG. 9B, while the rear end portion 14A of the roof head lining 14 is being sandwiched between the clip 64 and the pin 66, the rear end portion 14A is separated from the roof panel 12. Then, the back window air-bag 30 projects to the vehicle interior side from the space between the rear end portion 14A and the roof panel 12 (backdoor opening upper 18), and expands along the backdoor 22. Thereby, the head of a backseat passenger is protected against a crash on the rear face.

Thus, in the ceiling structure 60 of the rear portion of the vehicle and the clip assembly 62, the holding load F5 of the clip 64 relative to the bracket 25 is sufficiently small relative to the holding load F4 of the pin 66 relative to the clip 64. Consequently, in the case that the downward load of the roof head lining 14 acts, as mentioned above, the connection of the clip 64 relative to the bracket 25 is released. Thereby, the state, wherein the roof head lining 14 is sandwiched by the clip 64 and the pin 66, is maintained, so that the components of the clip assembly 11 are never detached from the roof panel 12 (bracket 25) and the roof head lining 14, and never fly apart inside the vehicle interior.

Moreover, in the ceiling structure 60 of the rear portion of the vehicle and the clip assembly 62, at the end of an assembling operation, the pin 66 is inserted into the clip 64 through the through-bore 14B from the lower side (vehicle interior side) of the roof head lining 14. Consequently, while viewing the position of the clip 64 through the through-bore 14B, the assembling operation can be carried out. Specifically, the operation of allocating the roof head lining 14 so as to match the position of the through-bore 14B of the roof head lining 14 to the position of the clip 64, becomes easy.

Incidentally, although the above-mentioned embodiment shows an example wherein the ceiling structures 10, 60 of the rear portion of the vehicle, the clip assembly 11, and the clip assembly 62 are applied for the purpose of attaching the rear end portion 14A of the roof head lining 14 to the roof panel 12 to be detachable, the present invention is not limited to the above. For example, the present invention may be applied to the purpose of fixing both ends of a vehicle width direction of the roof head lining 14 and the like to the roof panel 12 and the like.

What is claimed is:
1. A clip structure, comprising:
   a first clip adapted to be attached to an attaching body and having a first cylindrical portion, and a first engagement member formed at the first cylindrical portion,
   a joint forming a removable portion detachable from said first clip, said joint having a second cylindrical portion disposed inside the first cylindrical portion, a second engagement member engaging the first engagement member, and an engagement portion; and
   a second clip having an axis portion disposed inside the second cylindrical portion, and a third engagement member engaging the engagement portion, said second clip being arranged such that when the second clip is assembled with the first clip and the joint, an attached member is sandwiched between the second clip and the joint, and the axis portion is disposed inside the first and second cylindrical portions,
   wherein a load required for releasing a connection between said joint and the second clip is set larger than a predetermined load required for detaching the joint from said first clip.

2. A holding structure for a vehicle interior member, comprising:
   an exterior member constituting a vehicle and including an attachment hole;
   an interior member provided on a vehicle interior side relative to said exterior member and including a through-bore; and
   said clip structure according to claim 1,
   wherein the first clip is attached to the attachment hole of said exterior member, and
   the second clip is inserted into the through-bore of said interior member.

3. A holding structure for a vehicle interior member according to claim 2, further comprising an air-bag disposed between the exterior member and the interior member, and gas supply means for supplying gas to said air-bag in a predetermined case, and
   wherein said predetermined load is set as a load reached by expanding said air-bag between the exterior member and the interior member upon receiving gas supply from said gas supply means.

4. A holding structure for a vehicle interior member according to claim 3, wherein said exterior member and the interior member constitute a portion including a rear end side of a front-back direction of the vehicle in a ceiling portion of the vehicle, and
   wherein said air-bag is a back window air-bag expanding along a back window of the vehicle by receiving the gas supply from said gas supply means.

5. A clip structure according to claim 1, wherein the first engagement member is an engagement claw projecting inwardly from the first cylindrical portion, and the second engagement member is an engagement groove formed around the second cylindrical portion.

6. A clip structure according to claim 5, wherein the third engagement member is an engagement claw formed at an upper portion of the second clip, said engagement claw of the second clip being located above the engagement portion of the joint when the first and second clips and the joint are assembled.

7. A clip structure according to claim 6, wherein the joint further includes a flange at a lower portion thereof, and said second clip further includes another flange at a lower portion thereof to sandwich the attached member between the flange and another flange.

8. A clip structure according to claim 7, wherein the first clip includes a further flange at a lower portion of the first cylindrical portion, and another engagement claw spaced from the further flange for sandwiching the attaching body therebetween.

* * * * *